Jan. 19, 1960  J. J. MEDE  2,921,814
SKYLIGHT STRUCTURE FOR TRAILER VEHICLES
Filed Dec. 31, 1956
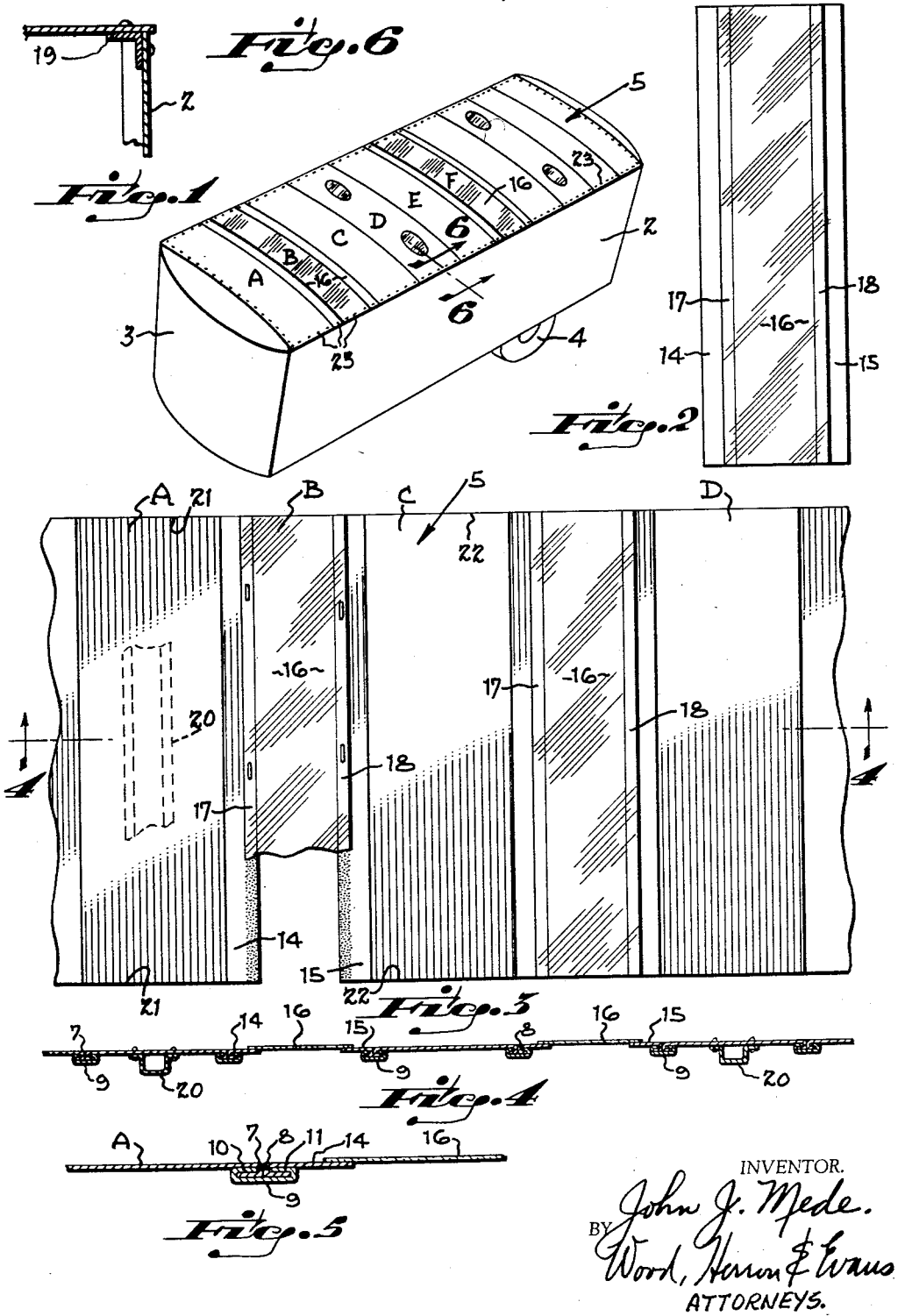
INVENTOR.
John J. Mede.
BY Wood, Herron & Evans
ATTORNEYS.

United States Patent Office 2,921,814
Patented Jan. 19, 1960

2,921,814

SKYLIGHT STRUCTURE FOR TRAILER VEHICLES

John J. Mede, Cincinnati, Ohio, assignor to Trailmobile, Inc., Cincinnati, Ohio, a corporation of Delaware Application December 31, 1956, Serial No. 631,692

2 Claims. (Cl. 296—137)

This invention relates to trailer vehicles and is directed particularly to improvements in skylight structures through which the interiors of the vehicles may be illuminated to facilitate cargo loading and unloading.

A typical roadway trailer comprises a body totally enclosed by side and front walls and a roof, except at the rear end where hinged doors are provided through which cargo is loaded and unloaded. Because of the substantial length of a modern trailer vehicle, for example twenty-five feet or more, the interior, even when the doors are wide open, is cavernous and the illumination generally is poor, especially at the front end.

Trailer vehicles heretofore have been made in which skylights have been located in the roof for overhead illumination. Such structures have been of generally conventional design, including one or more frames mounted on the roof panel and transparent windows respectively carried by the frames, all in water-tight connection with the roof. The cost of fabrication and assembly of such structures is appreciable, in view of the necessity of multi-fastening and caulking the frame to the roof member and the window to the frame, and the framing members are relatively heavy, for which reason special supports are required to prevent undue vibration during use. Also, the framing or other elements of the assembly interrupt a smooth roof contour which is desirable to reduce resistance to air flow.

The principal objective of this invention has been to provide a trailer vehicle having one or more skylights in its roof structure wherein the light-transmitting or translucent skylight areas constitute a virtually continuous part of the roof proper.

A further objective of this invention has been to provide a roof structure for a trailer vehicle comprising a unitized assembly of panels, some being made entirely of sheet metal and some comprising areas which are translucent or transparent to light, which unitized assembly after fabrication may be rolled upon itself for transportation to the top of the trailer vehicle, then unrolled and fastened in place upon the vehicle as a roof therefor.

A further objective of this invention has been to provide a trailer vehicle roof structure comprising a series of panels of duplicate or substantially duplicate dimension in length and width, all presenting sheet metal edges adapted for interlocking connection with one another, but with portions of some or all of the panels comprising plastic sheet material translucent or transparent to light adhesively associated with the sheet metal constituting the edgewise portions of the panels.

A still further objective of the invention has been to provide a trailer vehicle having a roof in the form of a skin or membrane extending from front to rear and from side-to-side of the vehicle with certain portions of the skin or membrane being constituted by sheet metal, and certain other portions of the skin or membrane being constituted by light-transparent or translucent plastic material adhesively secured in the general plane of the membrane without substantial interruption to its surface contour.

A further objective of this invention has been to provide a skylight for a trailer vehicle wherein the area through which light may pass is a sheet of flexible but water-resistant plastic composition or reinforced laminate thereof, which plastic composition is adhesively secured to sheet metal forming a roof, in marginally overlapping relationship to the sheet metal whereby the skylight area structurally forms a virtual continuation of the sheet metal.

Other objectives of the invention and further advantages which it provides appear in the following detailed description of the drawings wherein various embodiments of the invention are disclosed.

In the drawings:

Figure 1 is a perspective view of a trailer body having a roof made in accordance with one of the embodiments of this invention;

Figure 2 is a plan view showing an individual skylight roof panel section;

Figure 3 is a plan view showing in assembly a plurality of individual roof panels, some being skylights arranged in accordance with this invention.

Figure 4 is a sectional view taken on the line 4—4 of Figure 3;

Figure 5 is an enlarged sectional view similar to Figure 4 showing a suitable lock-seam construction for interconnecting adjacent panels; and Figure 6 is an enlarged sectional view taken on the line 6—6 of Figure 1 showing interconnection of the outer edges of the roof panel assembly with a perimeter top rail of the body.

Briefly in accordance with this invention, a skylight for the roof of a trailer vehicle is provided by lapping plastic sheet material, which is translucent or transparent to light, such as that commonly made from polyester or epoxy resin marginally over the edges of a gap or opening formed within or delineated by one or more sheet metal members forming all or part of the roof proper of a trailer vehicle, and adhesively bonding the plastic material to the sheet metal at the areas of marginal overlap, at one or both sides of the sheet metal, thereby providing a roof area through which the interior of the trailer vehicle will be illuminated but through which rain water cannot pass. By bonding or thermo-bonding of the skylight sheeting to the metal sheet material, the skylight area thus forms part of a smooth roof contour except for the inconsequential thickening at the area of overlap. By the utilization of plastic sheet material of the type mentioned, which is sufficiently flexible to be rolled up, the entire roof skin for a vehicle may be fabricated at the ground level, then rolled or coiled upon itself to facilitate disposition over the structural members of the vehicle, carried to the vehicle, unrolled, and suitably fastened in place with a minimum of labor. The skylight area of the roof may comprise one or a plurality of small openings or may extend, as one or more panels, entirely across the vehicle from one side to the other or throughout the entire length of the vehicle from front to rear.

In one mode of construction the roof may be an assembly of panels laid from one side wall to the other, some of the panels being made of sheet metal and others of plastic material adhesively secured to the marginal edges of the former, the edges of all of the panels extending longitudinally of the trailer being secured to flanges extending inwardly from the tops of the side walls as by screws or riveting, with or without the use of gasketing or caulking composition at these points.

In the alternative, to facilitate fabrication of a roof from panels which are individually of a size small enough to be cut and handled conveniently, the roof may be made of sheet metal panels and one or more plastic sheet panels, but with the edges of the plastic sheets having sheet metal strips marginally bonded thereto, the sheet metal thus forming the edges of all of the panels being configured for locking or seam connection with one another.

The trailer vehicle shown in Figure 1 is of the semi-trailer type having side walls 2 and an end wall 3 appropriately mounted on a chassis (not shown), having rear wheels 4 and, at its front end, an upper fifth wheel structure which is not shown but which is adapted for draft interconnection with a lower fifth wheel of a tractor in the usual manner. The roof structure is indicated generally at 5. It will be understood that the semi-trailer shown in Figure 1 is illustrative only and that the present invention is adapted to be used on the bodies of full trailers, trucks, or other roadway vehicles as desired.

In the preferred construction of the present invention, the roof 5 of the vehicle is made up of panels respectively designated A, B, C, D, etc., arranged in edge-to-edge relation to one another. For convenience in fabricating panels of a size which are small enough to be handled individually, these panels are dimensioned to extend from one side wall 2 of the trailer to the other, although if desired they may extend longitudinally from front to rear. The panels preferably are of the same, or substantially the same, dimension in length and width. Some of the panels, for example A, C, D, E, are fabricated entirely of sheet metal, either steel or aluminum as desired, but other of the panels, such as B and F, as shown in position in Figure 1, are designated skylight panels through which light may pass to illuminate the trailer interior.

The adjacent edges of all of the panels which make up the unitized roof are interconnected with one another in any suitable manner. For example, as shown in Figures 4 and 5, the edges of adjacent panels are flanged reversely as at 7 and 8 respectively, and a lock-seam or clincher strip 9 has inwardly extending flange portions 10 and 11 which are bent to interlock with the flanges 7 and 8 and form water-tight seals therewith. The fabrication of lock-seams of the type illustrated or of other suitable types is understood by those who are skilled in the art. In this manner, all of the panels are interconnected to form a unitized roof membrane for the trailer vehicle.

The skylight panels B, however, differ from the sheet metal roof panels 5 in that while their edgewise portions are of sheet metal, their central portions comprise light-transmitting or transparent plastic sheet material adhesively bonded to the edgewise sheet metal portions. This is as illustrated in Figure 3 wherein the edgewise sheet metal portions of a typical skylight panel B are designated 14 and 15, while the light-transmitting sheet material is designated 16. The light-transmitting sheet material 16 overlaps marginally the inward faces of the sheet metal strips 14 and 15 as at 17 and 18, and the sheet metal and plastic sheets are bonded facially, at one or both sides of the sheet metal at the areas of overlap.

The plastic sheet material adapted to be used in the practice of this invention may be of a polyester or epoxy resinous composition of which a variety are known, such as Rohm & Haas #444, Interchemical Corp. #312–2, or the like. Polyester and other resinous compositions fabricated into sheets are available which are stable under sunlight, which possess low water and oil absorption, good heat stability, and high flexural and tensile strength. If desired, as is preferred in the practice of this invention, the plastic sheet material may be reinforced as by a laminate construction in which one or more plies of fiberglass cloth are sandwiched or encased within the resin. For example, two plies of Owens-Corning fiberglass-type cloth #HG66, finish #136 is found to be suitable. Depending upon the character of the resin chosen in the fabrication of the plastic sheet material and upon whether or not reinforcement is incorporated or the type of reinforcement selected, the plastic sheet material will be either transparent or translucent, for which reason either may be characterized as light-transmitting.

To bond the sheet material 16 to the sheet metal, a suitable resinous adhesive is employed, for example, General Mills Company's Versamid #115 or Bakelite #ERL–2795, or combinations of these, or other resinous adhesive. The adhesive is applied as a film to the sheet metal or plastic sheet or both, preferably continuously over the areas of overlap, and the adhesive may be set by the application of heat, as is understood by those skilled in the art of bonding plastics to metals. Staples may be used to hold the sheet metal and plastic sheet members in predetermined alignment prior to the time the adhesive is set. The stables, when clinched in place, additionally prevent delamination. Excellent results, that is high bond strength, water impenetrability, and high flexural strength are obtained by an overlap of approximately 1½″.

For this mode of fabrication, the plastic sheet material may be obtained in rolls, cut to length and subsequently bonded to the sheet metal, but it will also be understood that the bonding of the plastic sheet material to the sheet metal in the formation of the skylight panels may proceed as an incident in the formation of the plastic sheet material itself, and that the bond may be executed at both sides of the sheet metal instead of on the one side only as is shown in Figure 5.

It will be seen, therefore, that the fabrication of a roof panel 5 may proceed by seaming together serially the adjacent edges of panels A, B, C, D, etc., in sufficient number to constitute a roof membrane which will fit over the entire roof of the vehicle. This membrane, fabricated at ground level in the shop, may then be rolled up, transported to the top of the vehicle, then unrolled and fastened to the body. As many skylight panels may be incorporated in the completed membrane as are desired or necessary to suit the customer's requirements. The expense and nuisance of fabricating individual skylight frames and installing them upon the roof after it is in place, as has been the usual custom in the past, are eliminated.

The bodies of cargo vehicles terminate in one type or another of a perimeter top rail 19 which is provided with inwardly extending flanges. In addition, the typical vehicles usually comprise roof bows extending from one side wall to the other at spaced intervals longitudinally of the trailer. These are indicated at 20 in Figure 4. The bows support the roof membrane 5 against inward collapse and also tie the side walls to one another at the perimeter top rail 19.

In the fabrication of a roof membrane of the type described, the longitudinally extending edges of the skylight panels B, that is, the edges of such panels which extend in directions longitudinally of the trailer, are in alignment with the corresponding edges of the sheet metal panels A, C, etc., as is shown by the aligned edges 21, 22 in Figure 3. Thus, the outermost edges of the roof membrane 5 overlap the perimeter top rail 19 along the side walls, and also at the front and back ends of the body.

A roof fabricated in accordance with the present invention is fastened to the trailer vehicle by means of screws or rivets located at spaced intervals passing through the longitudinal edgewise portions of the roof membrane into or through the perimeter top rail 19. Preferably, to insure water-tightness at these joints, a caulking compound or gasketting is applied before the roof skin is laid in place and after fastenings 23 are applied. In this respect, it will be noted that at the areas where the plastic sheets overlap the sheet metal portions of each edgewise panel and at the lock-seams, an offset occurs corresponding to the thickness of the sheet metal or to the thickness of the plastic material overlapping the sheet metal as the case may be. However, since both the sheet metal and the plastic material are thin, the overlap is not appreciable and it has been found that the caulking compound reliably excludes water from entering through the gaps which might otherwise occur at these areas. The roof fasteners 23 may extend, in one or more rows, through the longitudinal edgewise portions of both the sheet metal and plastic sheet materials carried on the perimeter top rail and thereby may constitute the sole connection of the roof membrane 5 to the vehicle body. If desired, additional fasteners may be used to interconnect the panels to the roof bows, but the usual rows of cross rivets are unnecessary.

Where only nominal skylighting of a trailer interior is intended, the roof may be made up entirely of sheet metal panels, but with certain of them, such as shown by panel D in Figure 1, having one or more apertures cut therein over which plastic sheet material is placed and to which the plastic sheet material is bonded in the manner described.

Having described my invention, I claim:

1. In combination with a trailer vehicle body having a perimeter top rail and roof bows, a roof for said body having its central portion supported upon said roof bows and its outer edges fastened to said perimeter top rail, said roof comprising panels arranged in edge-to-edge relation, the said panels having their adjacent edges in lock-seam connection, some of said panels being integral elongated sheet metal members, at least one of said panels comprising two elongated metal fastening portions spaced apart from one another, each said fastening portion having one longitudinal edge portion thereof configurated to form a lock-seam connection with adjoining panels, an elongated sheet of translucent plastic material coextensive with said metal fastening portions, and an adhesive securing the longitudinal edge portions of said plastic sheet in overlapping relation to the other longitudinal edge portion of said fastening portions, whereby all of the interconnected panels form a continuing roof membrane and the perimeter fastening of the membrane secures the same to the said body.

2. For use with a trailer vehicle body having a perimeter top rail and roof bows, a roll of interconnected roofing panels for said body and adapted to be rolled on said body with its central portion supported upon said roof bows and its outer edges fastened to said perimeter top rail, said roll comprising panels arranged in edge-to-edge relation, the said panels having their adjacent edges in lock-seam connection, some of said panels being integral elongated sheet metal members, at least one of said panels comprising two elongated metal fastening portions spaced apart from one another, each said fastening portion having one longitudinal edge portion thereof configurated to form a lock-seam connection with adjoining panels, an elongated sheet of translucent plastic material coextensive with said metal fastening portions, and an adhesive securing the longitudinal edge portions of said plastic sheet in overlapping relation to the other longitudinal edge portions of said fastening portions, whereby all of the interconnected panels form a continuing roof membrane.

References Cited in the file of this patent

UNITED STATES PATENTS

| | | |
|---|---|---|
| 1,740,749 | Shuman | Dec. 24, 1929 |
| 1,899,857 | Dubos | Feb. 28, 1933 |
| 2,365,934 | Black | Dec. 26, 1944 |
| 2,427,229 | Riley | Sept. 9, 1947 |
| 2,537,743 | Crafton | Jan. 9, 1951 |
| 2,721,157 | Martin et al. | Oct. 18, 1955 |

FOREIGN PATENTS

| | | |
|---|---|---|
| 392,923 | Great Britain | May 25, 1933 |
| 507,957 | Great Britain | June 23, 1939 |
| 252,260 | Switzerland | Sept. 16, 1948 |

OTHER REFERENCES

"Fleet Built Plastic Bodies Can Take It" (Snyder), published by Commercial Car Journal, February 1954; 4 pages.